(12) United States Patent
Paluri et al.

(10) Patent No.: US 12,034,957 B2
(45) Date of Patent: Jul. 9, 2024

(54) IMAGE ENCODING/DECODING METHOD AND DEVICE USING WEIGHTED PREDICTION, AND METHOD FOR TRANSMITTING BITSTREAM

(71) Applicant: LG ELECTRONICS INC., Seoul (KR)

(72) Inventors: Seethal Paluri, Seoul (KR); Seung Hwan Kim, Seoul (KR); Jie Zhao, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/209,926

(22) Filed: Jun. 14, 2023

(65) Prior Publication Data

US 2023/0328268 A1    Oct. 12, 2023

Related U.S. Application Data

(63) Continuation of application No. 17/695,383, filed on Mar. 15, 2022, now Pat. No. 11,716,483, which is a continuation of application No. PCT/KR2020/012495, filed on Sep. 16, 2020.

(60) Provisional application No. 62/901,243, filed on Sep. 16, 2019.

(51) Int. Cl.
| | |
|---|---|
| *H04N 11/02* | (2006.01) |
| *H04N 19/169* | (2014.01) |
| *H04N 19/176* | (2014.01) |
| *H04N 19/503* | (2014.01) |
| *H04N 19/70* | (2014.01) |

(52) U.S. Cl.
CPC ........ *H04N 19/503* (2014.11); *H04N 19/176* (2014.11); *H04N 19/188* (2014.11); *H04N 19/70* (2014.11)

(58) Field of Classification Search
CPC .................................................... H04N 19/503
USPC ....................................... 375/240.01–240.29
See application file for complete search history.

(56) References Cited

U.S. PATENT DOCUMENTS

| | | | |
|---|---|---|---|
| 2006/0268166 A1* | 11/2006 | Bossen ................ | H04N 19/463 375/E7.199 |
| 2008/0198927 A1* | 8/2008 | Wu ...................... | H04N 19/573 375/E7.199 |
| 2009/0034854 A1* | 2/2009 | Lee ...................... | H04N 19/176 375/E7.125 |
| 2009/0279608 A1* | 11/2009 | Jeon ...................... | H04N 19/50 375/240.24 |

(Continued)

*Primary Examiner* — Leron Beck
(74) *Attorney, Agent, or Firm* — Bryan Cave Leighton Paisner LLP

(57) ABSTRACT

An image encoding/decoding method and apparatus are provided. An image decoding method performed by an image decoding apparatus may comprise parsing weight information specifying a weight for a reference sample from a bitstream according to a weight parameter syntax structure, and decoding a current block by performing inter prediction based on the weight information. The parsing according to the weight parameter syntax structure may comprise obtaining weight number information specifying the number of weight information obtained from the bitstream according to the weight parameter syntax structure and obtaining weight information from the weight parameter syntax structure based on the weight number information.

11 Claims, 21 Drawing Sheets

(56) References Cited

U.S. PATENT DOCUMENTS

| | | | |
|---|---|---|---|
| 2013/0057646 A1* | 3/2013 | Chen | H04N 19/172 |
| | | | 348/43 |
| 2015/0103898 A1* | 4/2015 | Ye | H04N 19/573 |
| | | | 375/240.12 |
| 2015/0222921 A1* | 8/2015 | Sato | H04N 19/96 |
| | | | 375/240.12 |
| 2016/0277758 A1* | 9/2016 | Ikai | H04N 19/91 |

* cited by examiner

FIG. 4
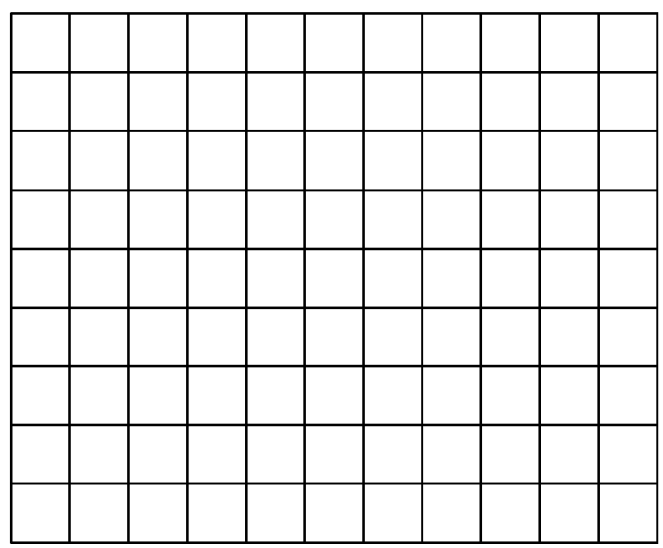
FIG. 5
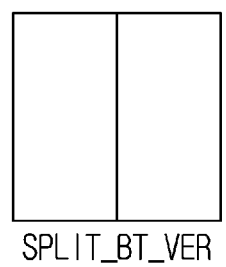 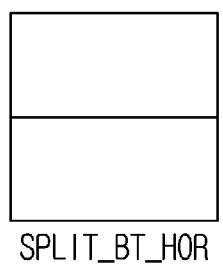 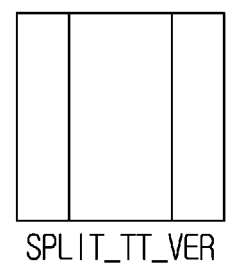 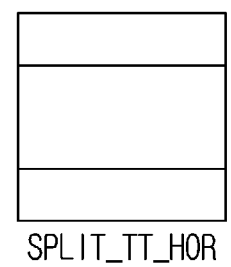
SPLIT_BT_VER   SPLIT_BT_HOR   SPLIT_TT_VER   SPLIT_TT_HOR

| seq_parameter_set_rbsp( ) { | Descriptor |
|---|---|
|    sps_decoding_parameter_set_id | u(4) |
| ... | |
|    sps_weighted_pred_flag | u(1) |
|    sps_weighted_bipred_flag | u(1) |
| ... | |
| } | |

| pic_parameter_set_rbsp( ) { | Descriptor |
|---|---|
|    pps_pic_parameter_set_id | ue(v) |
| ... | |
|    pps_weighted_pred_flag | u(1) |
|    pps_weighted_bipred_flag | u(1) |
| ... | |

FIG. 21

| slice_header( ) { | Descriptor |
|---|---|
|     slice_pic_parameter_set_id | ue(v) |
|     ... | |
|     if( ( nal_unit_type != IDR_W_RADL && nal_unit_type != IDR_N_LP ) \|\|<br>        sps_idr_rpl_present_flag ) { | |
|         for( i = 0; i < 2; i++ ) { | |
|             if( num_ref_pic_lists_in_sps[ i ] > 0 && !pps_ref_pic_list_sps_idc[ i ] &&<br>                  ( i == 0 \|\| ( i == 1 && rpl1_idx_present_flag ) ) ) | |
|                 ref_pic_list_sps_flag[ i ] | |
|             if( ref_pic_list_sps_flag[ i ] ) { | |
|                 if( num_ref_pic_lists_in_sps[ i ] > 1 &&<br>                    ( i == 0 \|\| ( i == 1 && rpl1_idx_present_flag ) ) ) | |
|                 ref_pic_list_idx[ i ] | |
|             } else | |
|                 ref_pic_list_struct( i, num_ref_pic_lists_in_sps[ i ] ) | |
|             for( j = 0; j < NumLtrpEntries[ i ][ RplsIdx[ i ] ]; j++ ) { | |
|                 if( ltrp_in_slice_header_flag[ i ][ RplsIdx[ i ] ] ) | |
|                 slice_poc_lsb_lt[ i ][ j ] | |
|                 delta_poc_msb_present_flag[ i ][ j ] | |
|                 if( delta_poc_msb_present_flag[ i ][ j ] ) | |
|                 delta_poc_msb_cycle_lt[ i ][ j ] | |
|             } | |
|         } | |
|         if( ( slice_type != I && num_ref_entries[ 0 ][ RplsIdx[ 0 ] ] > 1 ) \|\|<br>            ( slice_type == B && num_ref_entries[ 1 ][ RplsIdx[ 1 ] ] > 1 ) ) { | |
|             num_ref_idx_active_override_flag | |
|             if( num_ref_idx_active_override_flag ) | |
|                 for( i = 0; i < ( slice_type == B ? 2: 1 ); i++ ) | |
|                 if( num_ref_entries[ i ][ RplsIdx[ i ] ] > 1 ) | |
|                 num_ref_idx_active_minus1[ i ] | |
|         } | |
|     } | |
|     ... | |
|     if( ( pps_weighted_pred_flag && slice_type == P ) \|\|<br>        ( pps_weighted_bipred_flag && slice_type == B ) ) | |
|         pred_weight_table( ) | |
|     ... | |
| } | |

2110 { (bracketing the pps_weighted_pred_flag ... pred_weight_table( ) rows)

```
for( i = 0; i < 2; i++ ) {
    if( slice_type  = =  B || ( slice_type  = =  P && i  = =  0 ) ) {
        if( num_ref_idx_active_override_flag )
            NumRefIdxActive[ i ] = num_ref_idx_active_minus1[ i ] + 1
        else {
            if( num_ref_entries[ i ][ RplsIdx[ i ] ] >=  num_ref_idx_default_active_minus1[ i ] + 1
                NumRefIdxActive[ i ] = num_ref_idx_default_active_minus1[ i ] + 1
            else
                NumRefIdxActive[ i ] = num_ref_entries[ i ][ RplsIdx[ i ] ]
        }
    } else // slice_type  = =  I || ( slice_type  = =  P && i  = =  1 )
        NumRefIdxActive[ i ] = 0
}
```

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   for( i = 0; i < NumRefIdxActive[ 0 ]; i++ ) | |
|     luma_weight_l0_flag[ i ] | u(1) |
|   if( ChromaArrayType != 0 ) | |
|     for( i = 0; i < NumRefIdxActive[ 0 ]; i++ ) | |
|       chroma_weight_l0_flag[ i ] | u(1) |
|   for( i = 0; i < NumRefIdxActive[ 0 ]; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( slice_type == B ) { | |
|     for( i = 0; i < NumRefIdxActive[ 1 ]; i++ ) | |
|       luma_weight_l1_flag[ i ] | u(1) |
|     if( ChromaArrayType != 0 ) | |
|       for( i = 0; i < NumRefIdxActive[ 1 ]; i++ ) | |
|         chroma_weight_l1_flag[ i ] | u(1) |
|     for( i = 0; i < NumRefIdxActive[ 1 ]; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

FIG. 24

| adaptation_parameter_set_rbsp( ) { | Descriptor |
|---|---|
|   adaptation_parameter_set_id | u(5) |
|   aps_params_type | u(3) |
|   if( aps_params_type == ALF_APS ) | |
|     alf_data( ) | |
|   else if( aps_params_type == LMCS_APS ) | |
|     lmcs_data( ) | |
|   else if( aps_params_type == SCALING_APS ) | |
|     scaling_list_data( ) | |
|   else if( aps_params_type == PRED_WEIGHT_APS ) | |
|     pred_weight_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

FIG. 25

| slice_header( ) { | Descriptor |
|---|---|
|   slice_pic_parameter_set_id | ue(v) |
|   ... | |
|     if( ( pps_weighted_pred_flag && slice_type == P ) \|\| | |
|       ( pps_weighted_bipred_flag && slice_type == B ) ) | |
|     slice_pred_weight_aps_id | u(3) |
|   ... | |
| } | |

FIG. 26

| | |
|---|---|
| pred_weight_table( ) { | Descriptor |
|   luma_log2_weight_denom | ue(v) |
|   if( ChromaArrayType != 0 ) | |
|     delta_chroma_log2_weight_denom | se(v) |
|   num_lists_active_flag | u(1) |
|   for( i = 0; i < (!num_lists_active_flag ? 1 : 2); i++ ) | |
|     NumRefIdxActive[i] | ue(v) |
|   for( i = 0; i < NumRefIdxActive[ 0 ]; i++ ) | |
|     luma_weight_l0_flag[ i ] | u(1) |
|   if( ChromaArrayType != 0 ) | |
|     for( i = 0; i < NumRefIdxActive[ 0 ]; i++ ) | |
|       chroma_weight_l0_flag[ i ] | u(1) |
|   for( i = 0; i < NumRefIdxActive[ 0 ]; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if(num_lists_active_flag) { | |
|     for( i = 0; i < NumRefIdxActive[ 1 ]; i++ ) | |
|       luma_weight_l1_flag[ i ] | u(1) |
|     if( ChromaArrayType != 0 ) | |
|       for( i = 0; i < NumRefIdxActive[ 1 ]; i++ ) | |
|         chroma_weight_l1_flag[ i ] | u(1) |
|     for( i = 0; i < NumRefIdxActive[ 1 ]; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

2610, 2620, 2630, 2640

IMAGE ENCODING/DECODING METHOD AND DEVICE USING WEIGHTED PREDICTION, AND METHOD FOR TRANSMITTING BITSTREAM

CROSS-REFERENCE TO RELATED APPLICATIONS

This application is a continuation of U.S. patent Application Ser. No. 17/695,383, filed on Mar. 15, 2023, which is a Bypass Continuation of International Application No. PCT/KR2020/012495, filed on Sep. 16, 2020, which claims the benefit of U.S. Provisional Application No. 62/901,243, filed on Sep. 16, 2019, the contents of which are all hereby incorporated by reference herein in their entirety.

TECHNICAL FIELD

The present disclosure relates to an image encoding/decoding method and apparatus, and, more particularly, to an image encoding/decoding method and apparatus using weighted prediction, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus capable of improving encoding/decoding efficiency by efficiently signaling syntax elements related to weighted prediction.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise parsing weight information specifying a weight for a reference sample from a bitstream according to a weight parameter syntax structure, and decoding a current block by performing inter prediction based on the weight information.

The parsing according to the weight parameter syntax structure may comprise obtaining weight number information specifying the number of weight information obtained from the bitstream according to the weight parameter syntax structure and obtaining weight information from the weight parameter syntax structure based on the weight number information.

An image decoding apparatus according to an aspect of the present disclosure may comprise a memory and at least one processor. The at least one processor may parse weight information specifying a weight for a reference sample from a bitstream according to a weight parameter syntax structure and decode a current block by performing inter prediction based on the weight information. Furthermore, the processor may perform parsing according to the weight parameter syntax structure, by obtaining weight number information specifying the number of weight information obtained from the bitstream according to the weight parameter syntax structure and obtaining weight information from the weight parameter syntax structure based on the weight number information.

An image encoding method performed by an image encoding apparatus according to an aspect of the present disclosure may comprise generating a prediction block of a current block by performing inter prediction, generating weight information specifying a weight for a sample constructing the prediction block, determining weight number information specifying the number of weight information, and generating a bitstream including the weight number information and the weight information based on a weight parameter syntax structure.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus capable of improving encoding/decoding efficiency by efficiently signaling syntax elements related to weighted prediction.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIG. 21 is a view illustrating a weighted prediction syntax element signaled in a slice header according to an embodiment.

FIG. 22 is a view illustrating an algorithm according to an embodiment for deriving a value of a variable NumRefIdxActive[i].

FIG. 23 is a view illustrating weighted prediction table syntax called from a slice header according to an embodiment.

FIG. 24 is a view illustrating syntax in which a prediction weighted table is signaled in an APS RBSP according to an embodiment.

FIG. 25 is a view illustrating syntax according to an embodiment of a modified slice header.

FIG. 26 is a view illustrating a prediction weighted table syntax structure according to an embodiment.

MODE FOR INVENTION

Figure 1:
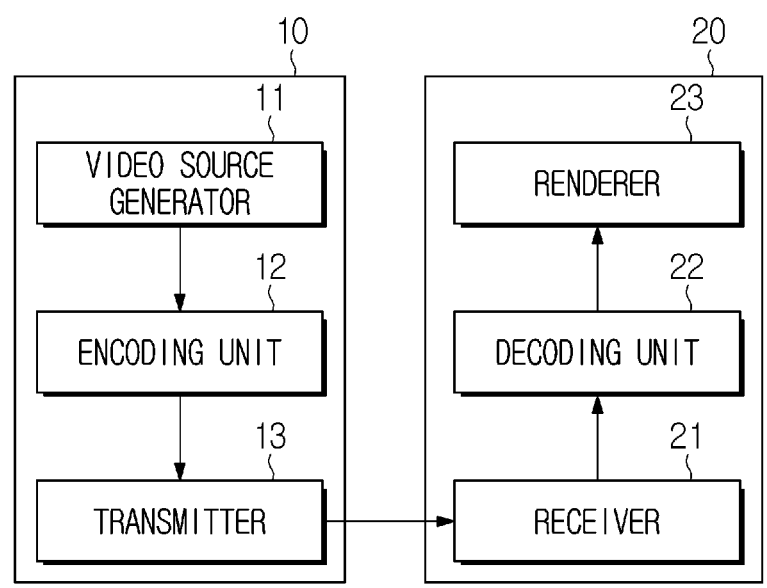
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs). Meanwhile, one tile may include one or more bricks. The brick may refer to a rectangular area of CTU rows in a tile. One tile may be split into a plurality of bricks, and each brick may include one or more CTU rows belonging to a tile.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
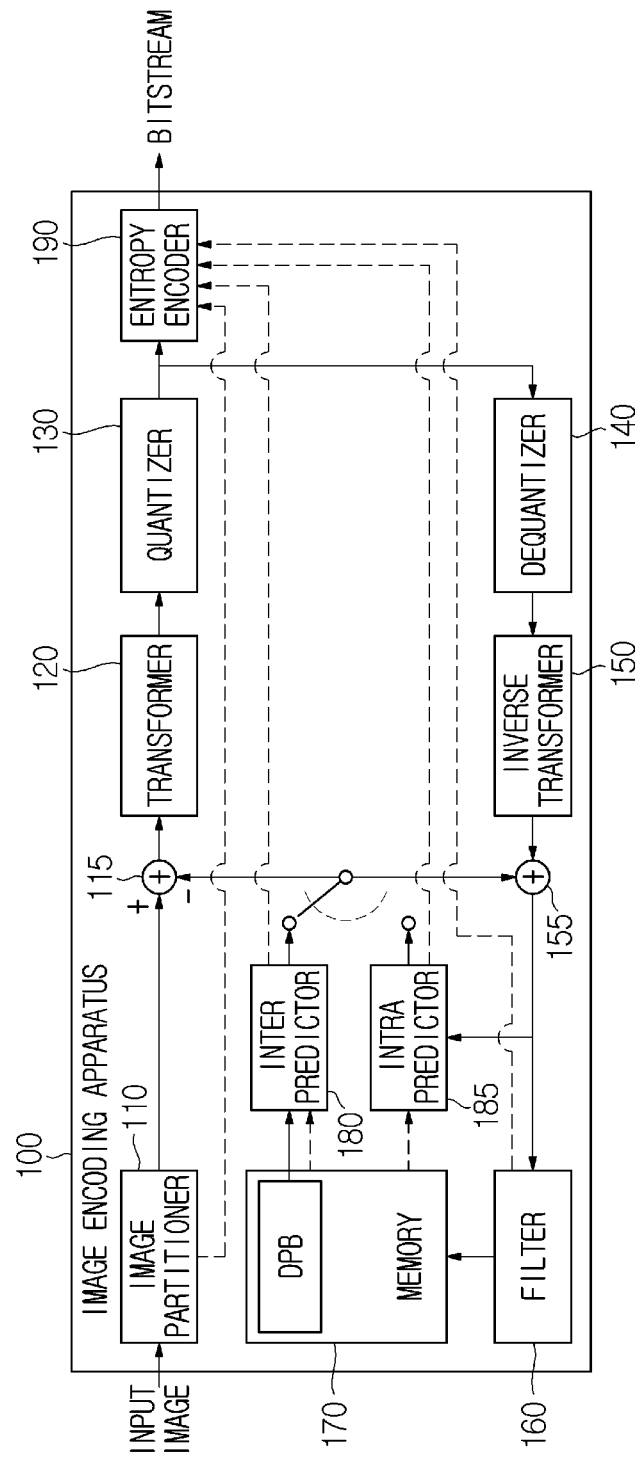
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
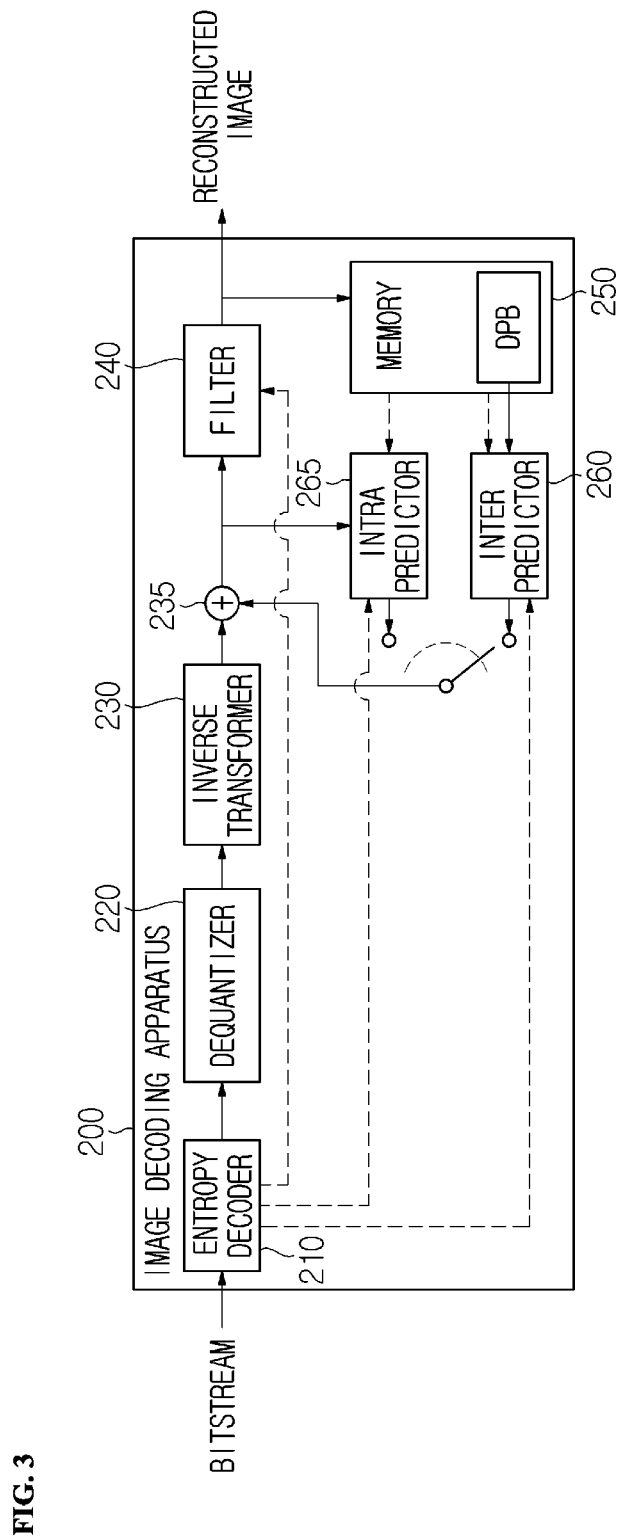
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
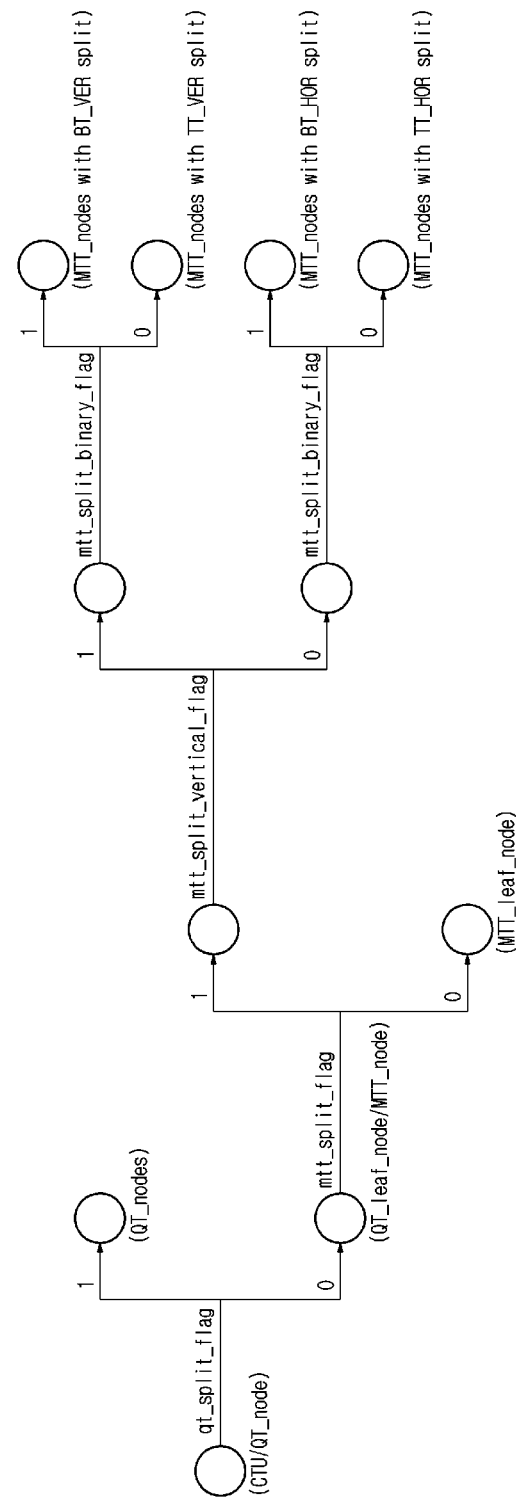
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

of TUs in a CU region. The TU size generally represents a luma component (sample) transform block (TB) size.

The TU size may be derived based a largest allowable TB size maxTbSize which is a predetermined value. For example, when the CU size is greater than maxTb Size, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
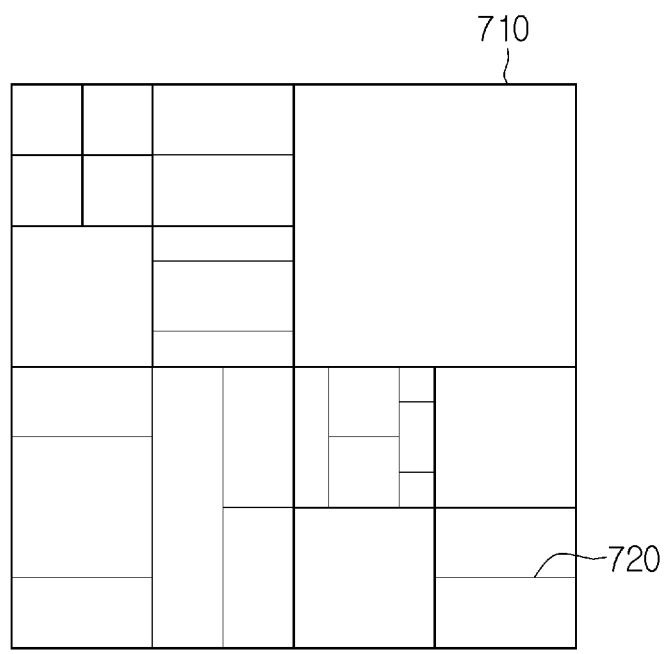
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multi-type tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Quantization/Dequantization

As described above, the quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients.

In encoding and decoding of moving image/still image, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_Y$ for a luma component (luma sample) and a quantization parameter $Q_C$ for a chroma component (chroma sample) may be differently set.

In a quantization process, a transform coefficient C may be received as input and divided by quantization rate Qstep, and a quantized transform coefficient C' may be obtained based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. By applying the quantization scale to the transform coefficient C, the quantized transform coefficient C' may be derived based on this.

A dequantization process is an inverse process of the quantization process, and the quantized transform coefficient C' may be multiplied by the quantization rate Qstep and a reconstructed transform coefficient C" may be obtained based on this. In this case, a level scale may be derived according to the quantization parameter, the level scale may be applied to the quantization transform coefficient C', and the reconstructed transform coefficient C" may be derived based on this. The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may apply. The adaptive frequency weighting quantization technology is a method of differently applying a quantization strength according to the frequency. In adaptive frequency weighting quantization, the quantization strength may differently apply according to the frequency using a predefined quantization scaling matrix. That is, the above-described quantization/dequantization process may be performed further based on the quantization scaling matrix. For example, a different quantization scaling matrix may be used according to a size of a current block and/or whether a prediction mode applying to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data. Based on the scaling list data, the (modified) quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Entropy Coding

Some or all of video/image information may be entropy-encoded by the entropy encoder 190 as described above with reference to FIG. 2, and some or all of video/image information described with reference to FIG. 3 may be entropy-decoded by the entropy decoder 310. In this case, the video/image information may be encoded/decoded in units of syntax elements. In the present disclosure, encoding/decoding information may include encoding/decoding by the method described in this section.

Figure 8:
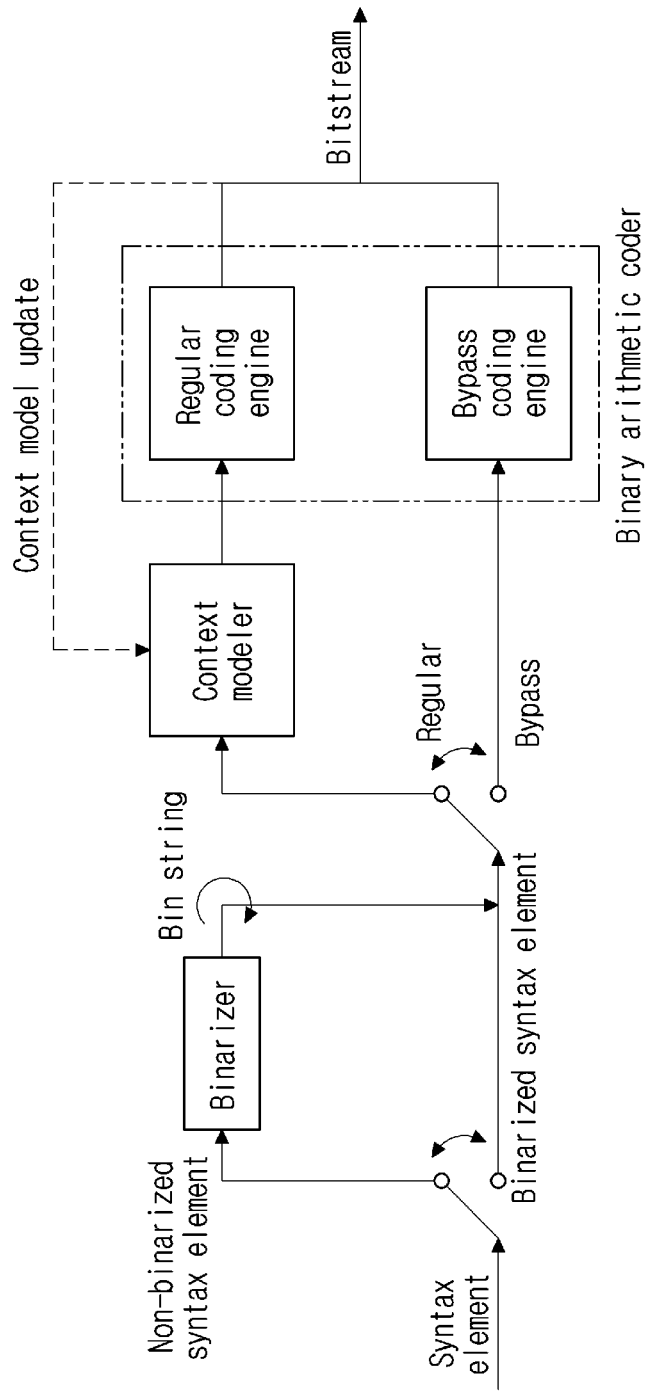
FIG. 8 is a block diagram of CABAC according to an embodiment for encoding one syntax element.

FIG. 8 is a block diagram of CABAC according to an embodiment for encoding one syntax element. In an encoding process of CABAC, first, when an input signal is a syntax element having a non-binary value, the input signal may be converted into a binary value through binarization. When the input signal already has a binary value, binarization may be bypassed without being performed. Here, a binary number 0 or 1 constructing a binary value may be referred to as a bin. For example, when a binary string (bin string) after binarization is 110, each of 1, 1 and 0 may be referred to as one bin. The bin(s) for one syntax element may specify the value of the corresponding syntax element.

The binarized bins may be input to a regular coding engine or a bypass coding engine. The regular coding engine may allocate a context model reflecting a probability value to the corresponding bin and encode the corresponding bin based on the allocated context model. In the regular coding engine, after performing coding on each bin, a probabilistic model for the corresponding bin may be updated. The bins coded in this way may be referred to as context-coded bins. In the bypass coding engine, a procedure for estimating a probability for the input bin and a procedure for updating a probabilistic model applying to the corresponding bin after coding may be omitted. In the case of the bypass coding engine, instead of allocating context, a coding rate may be improved by coding a bin input by applying a uniform probability distribution (e.g., 50:50). The bins coded in this way may be referred to as bypass bins. The context model may be allocated and updated for each context-coded (regularly coded) bin, and the context model may be specified based on ctxidx or ctxInc. ctxidx may be derived based on ctxInc. Specifically, for example, a context index ctxidx specifying a context model for each of the regularly coded bins may be derived as a sum of a context index increment ctxInc and a context index offset ctxIdxOffset. Here, ctxInc may be derived differently for each bin. ctxIdxOffset may be represented by the lowest value of ctxIdx. The lowest value of ctxIdx may be referred to as an initial value initValue of ctxIdx. ctxIdxOffset is a value used for distinguishment with context models for other syntax elements, and a context model for one syntax element may be distinguished/derived based on ctxinc.

In the entropy encoding procedure, whether encoding is performed through the regular coding engine or the bypass coding engine may be determined and a coding path may be switched. In entropy decoding, the same process as entropy encoding may be performed in reverse order.

Figure 9:
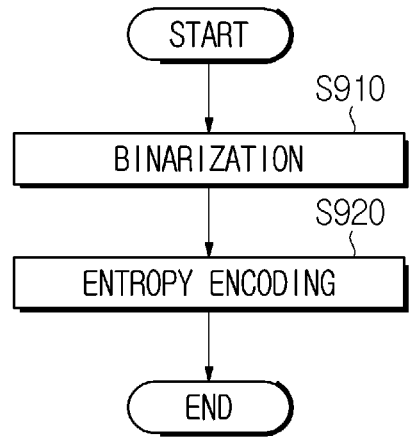
FIGS. 9 to 12 are views illustrating entropy encoding and decoding according to an embodiment.
Figure 10:
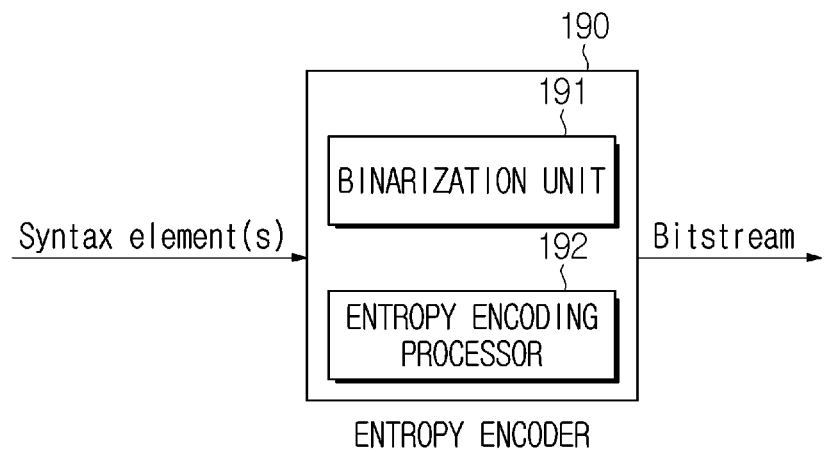

The above-described coding may be performed, for example, as shown in FIGS. 9 and 10. Referring to FIGS. 9 and 10, the encoding apparatus (entropy encoder) may perform an entropy coding procedure of image/video information. The image/video information may include partitioning related information, prediction related information (e.g., inter/intra prediction classification information, intra prediction mode information, inter prediction mode information, etc.), residual information, in-loop filtering related information, etc., or various syntax elements related thereto. The entropy coding may be performed in units of syntax elements. Steps S910 to S920 of FIG. 9 may be performed by the entropy encoder 190 of the encoding apparatus of FIG. 2.

The encoding apparatus may perform binarization on a target syntax element (S910). Here, binarization may be based on various binarization methods such as a Truncated Rice binarization process, a Fixed-length binarization process, etc., and the binarization method for the target syntax element may be predefined. The binarization procedure may be performed by a binarization unit 191 in the entropy encoder 190.

The encoding apparatus may perform entropy encoding on the target syntax element (S920). The encoding apparatus may regular-coding-based (context-based) or bypass-coding-based encode a bin string of the target syntax element based on an entropy coding technique such as context-adaptive arithmetic coding (CABAC) or context-adaptive variable length coding (CAVLC), and the output thereof may be included in a bitstream. The entropy encoding procedure may be performed by an entropy encoding processor 192 in the entropy encoder 190. The bitstream may be transmitted to the decoding apparatus through a (digital) storage medium or a network as described above.

Figure 11:
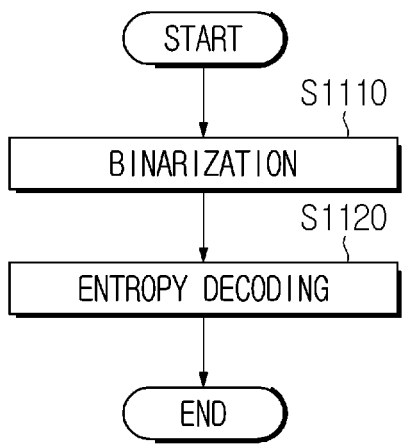
Figure 12:
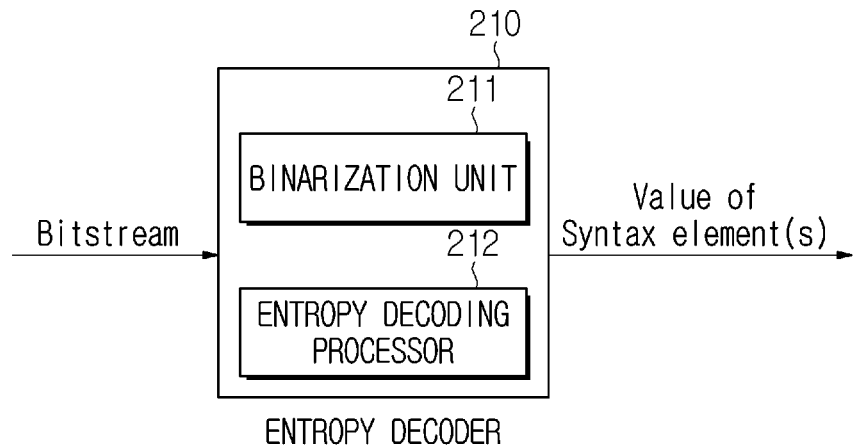

Referring to FIGS. 11 and 12, the decoding apparatus (entropy decoder) may decode encoded image/video information. The image/video information may include partitioning related information, prediction related information (e.g., inter/intra prediction classification information, intra prediction mode information, inter prediction mode information, etc.), residual information, in-loop filtering related information, etc., or various syntax elements related thereto. The entropy coding may be performed in units of syntax elements. Steps S1110 to S1120 may be performed by the entropy decoder 210 of the decoding apparatus of FIG. 3.

The decoding apparatus may perform binarization on a target syntax element (S1110). Here, binarization may be based on various binarization methods such as Truncated Rice binarization process, Fixed-length binarization process, etc., and the binarization method for the target syntax element may be predefined. The decoding apparatus may derive available bin strings (bin string candidates) for available values of the target syntax element through the binarization procedure. The binarization procedure may be performed by a binarization unit 211 in the entropy decoder 210.

The decoding apparatus may perform entropy decoding on the target syntax element (S1120). The decoding apparatus may compare the derived bin string with available bin strings for the corresponding syntax element, while sequentially decoding and parsing bins for the target syntax element from input bit(s) in the bitstream. If the derived bin string is equal to one of the available bin strings, a value corresponding to the corresponding bin string may be derived as a value of the corresponding syntax element. If not, a next bit in the bitstream may be further parsed and then the above-described procedure may be performed again. Through this process, the corresponding information may be signaled using a variable length bit without using a start bit or an end bit for specific information (specific syntax element) in the bitstream. Through this, relatively fewer bits may be allocated to a low value and overall coding efficiency may be increased.

The decoding apparatus may context-based or bypass-coding-based decode each bin in the bin string from the bitstream based on an entropy coding technique such as CABAC or CAVLC. The entropy decoding procedure may be performed by an entropy decoding processor 212 in the entropy decoder 210. The bitstream may include a variety of information for image/video decoding as described above. The bitstream be transmitted to the decoding apparatus through a (digital) storage medium or a network as described above.

In this disclosure, a table (syntax table) including syntax elements may be used to specify signaling of information from the encoding apparatus to the decoding apparatus. The order of the syntax elements of the table including the syntax elements used in this disclosure may specify a parsing order of the syntax elements from the bitstream. The encoding apparatus may construct and encode the syntax table such that the syntax elements are parsed by the decoding apparatus in parsing order, and the decoding apparatus may obtain values of the syntax elements by parsing and decoding the syntax elements of the syntax table from the bitstream in parsing order.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 13:
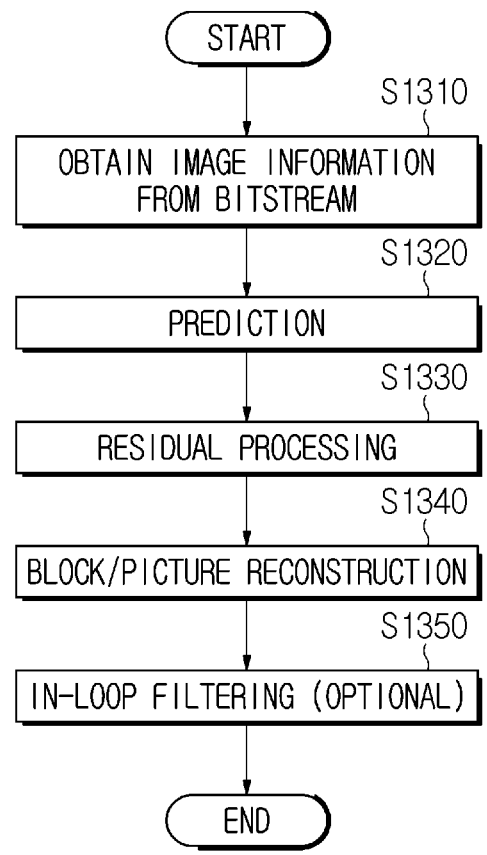
FIGS. 13 and 14 are views illustrating examples of a picture decoding and encoding procedure according to an embodiment.

FIG. 13 shows an example of a schematic picture decoding procedure, to which embodiment(s) of the present disclosure is applicable. In FIG. 13, S1310 may be performed in the entropy decoder 210 of the decoding apparatus described above with reference to FIG. 3, S1320 may be performed in a prediction unit including the intra prediction unit 265 and the inter prediction unit 260, S1330 may be performed in a residual processor including the dequantizer 220 and the inverse transformer 230, S1340 may be performed in the adder 235, and S1350 may be performed in the filter 240. S1310 may include the information decoding procedure described in the present disclosure, S1320 may include the inter/intra prediction procedure described in the present disclosure, S1330 may include a residual processing procedure described in the present disclosure, S1340 may include the block/picture reconstruction procedure described in the present disclosure, and S1350 may include the in-loop filtering procedure described in the present disclosure.

Referring to FIG. 13, the picture decoding procedure may schematically include a procedure for obtaining image/video information (through decoding) from a bitstream (S1310), a picture reconstruction procedure (S1320 to S1340) and an in-loop filtering procedure for a reconstructed picture (S1350), as described above with reference to FIG. 3. The picture reconstruction procedure may be performed based on prediction samples and residual samples obtained through inter/intra prediction (S1320) and residual processing (S1330) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S1350) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 14:
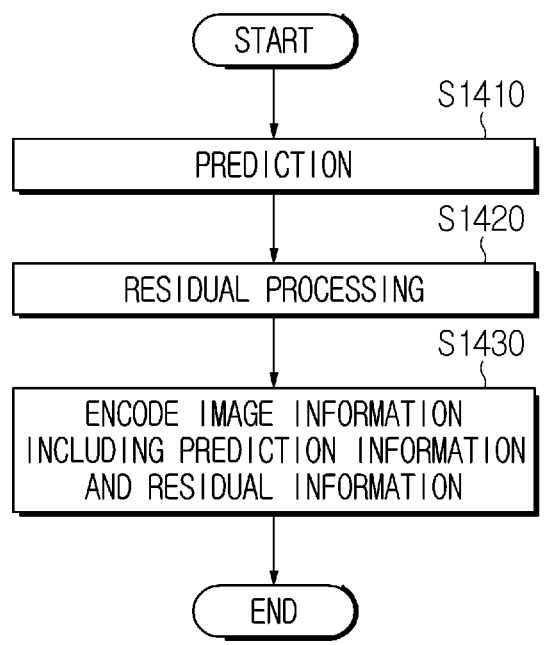

FIG. 14 shows an example of a schematic picture encoding procedure, to which embodiment(s) of the present disclosure is applicable. In FIG. 14, S1410 may be performed in the prediction unit including the intra prediction unit 185 or inter prediction unit 180 of the encoding apparatus described above with reference to FIG. 2, S1420 may be performed in a residual processor including the transformer 120 and/or the quantizer 130, and S1430 may be performed in the entropy encoder 190. S1410 may include the inter/intra prediction procedure described in the present disclosure, S1420 may include the residual processing procedure described in the present disclosure, and S1430 may include the information encoding procedure described in the present disclosure.

Referring to FIG. 14, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples, which are output of S1410, and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 15:
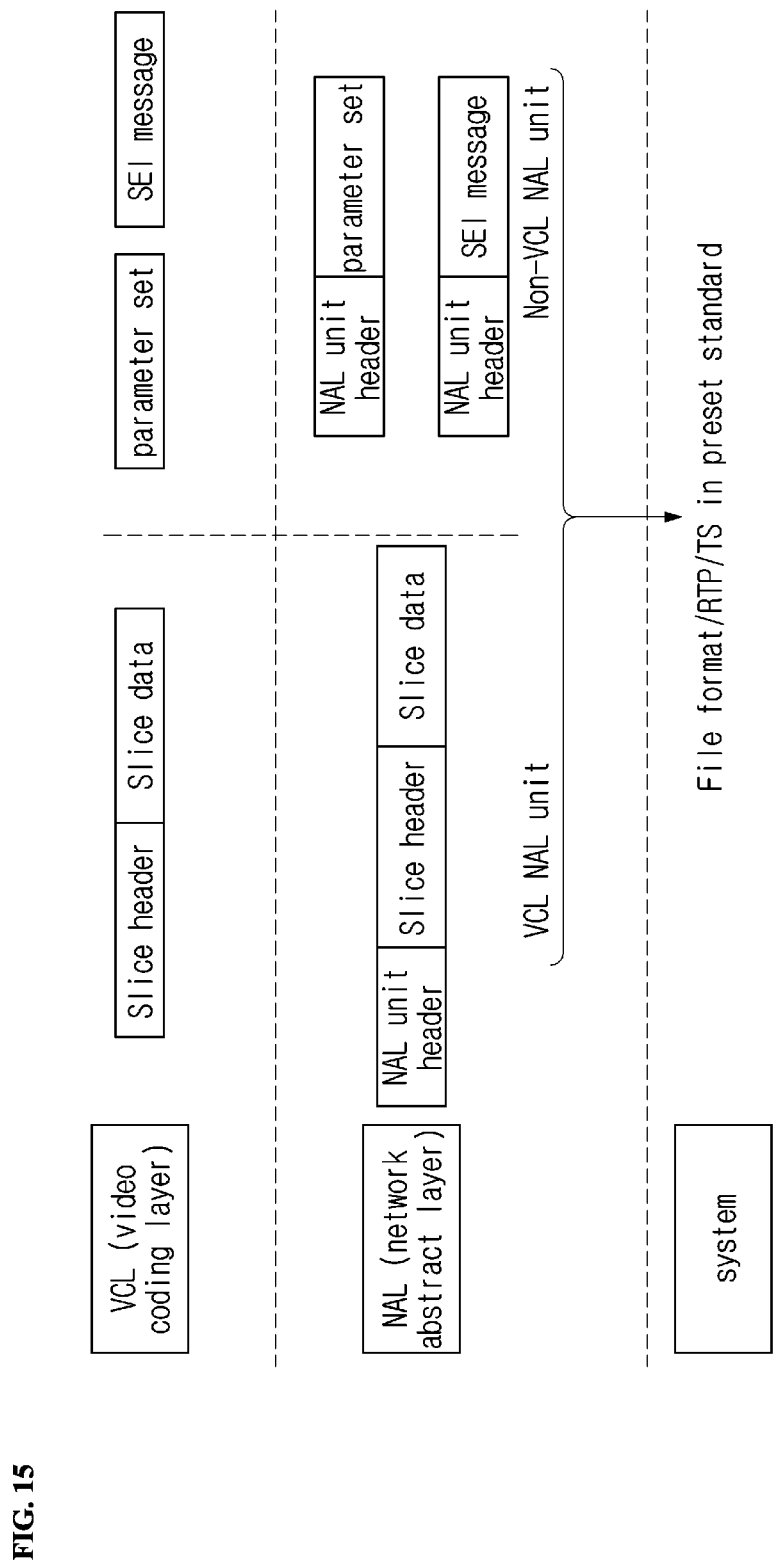
FIG. 15 is a view illustrating a layer structure for a coded image according to an embodiment.

FIG. 15 is a view showing a layer structure for a coded image. The coded image may be classified into a video coding layer (VCL) for an image decoding process and handling itself, a low-level system for transmitting and storing encoded information, and a network abstraction layer (NAL) present between the VCL and the low-level system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the low-level system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signalled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set included in the Non-VCL NAL unit type will be listed below.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

The above-described NAL unit types may have syntax information for a NAL unit type, and the syntax information may be stored in a NAL unit header and signalled. For example, the syntax information may be nal_unit_type, and the NAL unit types may be specified as nal_unit_type values.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to overall video. The DPS may include information/parameters related to concatenation of a coded video sequence (CVS). In the present disclosure, a high level syntax (HLS) may include at least one of the APS syntax, the PPS syntax, the SPS syntax, the VPS syntax, the DPD syntax or the slice header syntax.

In the present disclosure, image/video information encoded in the encoding apparatus and signalled to the decoding apparatus in the form of a bitstream may include not only in-picture partitioning related information, intra/inter prediction information, residual information, in-loop filtering information but also information on the slice header, information on the APS, information on the PPS, information on the SPS, and/or information on the VPS.

Overview of Inter Prediction

Hereinafter, detailed technology of an inter prediction method in the description of encoding and decoding with reference to FIGS. 2 and 3 will be described. In the case of the decoding apparatus, the inter prediction based video/image decoding method and the inter prediction unit in the decoding apparatus may operate according to the following description. In addition, data encoded by the following description may be stored in the form of a bitstream.

The prediction unit of an encoding/decoding apparatus may perform inter prediction in units of blocks to derive a prediction sample. Inter prediction may represent prediction derived in a manner that is dependent on data elements (e.g., sample values, motion information, etc.) of picture(s) other than a current picture. When inter prediction applies to the current block, a predicted block (prediction sample array) for the current block may be derived based on a reference block (reference sample array) specified by a motion vector on a reference picture indicated by a reference picture index. In this case, in order to reduce the amount of motion information transmitted in an inter prediction mode, motion information of the current block may be predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When applying inter prediction, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, collocated CU (ColCU), and the reference picture including the temporal neighboring block may be referred to as a collocated picture (colPic). For example, a motion information candidate list may be constructed based on the neighboring blocks of the current block, and flag or index information indicating which candidate is selected (used) may be signaled in order to derive the motion vector of the current block and/or the reference picture index. Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference.

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may indicate a motion vector associated with a reference picture list L0 (L0) and the L1 motion vector may indicate a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 16:
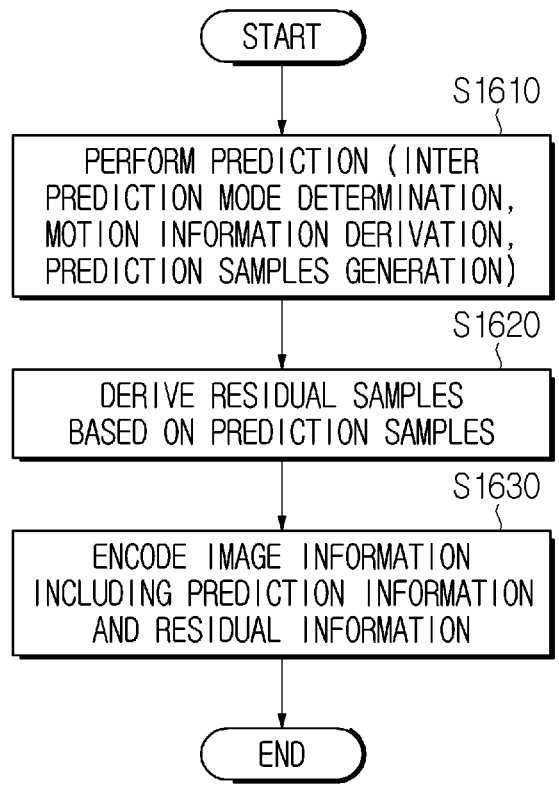
FIG. 16 is a view illustrating an encoding method using inter prediction according to an embodiment.
Figure 17:
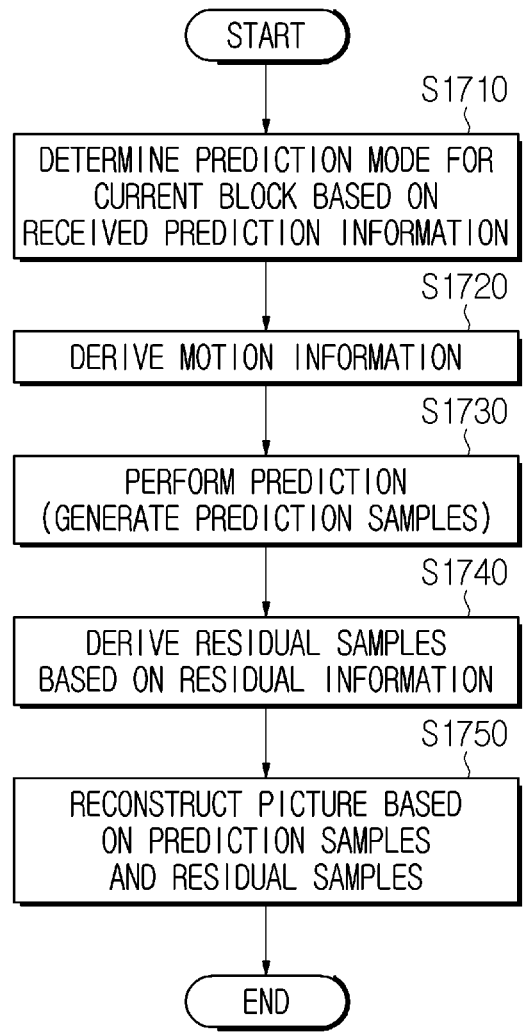
FIG. 17 is a view illustrating a decoding method using inter prediction according to an embodiment.

The video/image encoding procedure based on inter prediction and the inter prediction unit in the encoding apparatus may schematically include, for example, the following, which will be described with reference to FIG. 16. The encoding apparatus performs inter prediction with respect to a current block (S1610). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, the inter prediction unit of the encoding apparatus may include a prediction mode determination unit, a motion information derivation unit and a prediction sample derivation unit, and the prediction mode determination unit may determine the prediction mode of the current block, the motion information derivation unit may derive the motion information of the current block, and the prediction sample derivation unit may derive the prediction samples of the current block. For example, the inter prediction unit of the encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The encoding apparatus may determine a mode applying to the current block among various prediction modes. The encoding apparatus may compare RD costs for the various prediction modes and determine an optimal prediction mode of the current block.

For example, when a skip mode or a merge mode applies to the current block, the encoding apparatus may construct a merge candidate list described below and derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to the decoding apparatus. The motion information of the current block may be derived using the motion information of the selected merge candidate.

As another example, when an (A)MVP mode applies to the current block, the encoding apparatus may construct an (A)mvp candidate list described below and derive a motion vector of an mvp candidate selected from among mvp candidates included in the (a)MVP candidate list. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, information on the MVD may be signaled to the decoding apparatus. In addition, when applying the (A)MVP mode, the value of the reference picture index may be constructed as reference picture index information and separately signaled to the decoding apparatus.

The encoding apparatus may derive residual samples based on the prediction samples (S1620). The encoding apparatus may derive the residual samples through comparison between original samples of the current block and the prediction samples.

The encoding apparatus encodes image information including prediction information and residual information (S1630). The encoding apparatus may output the encoded image information in the form of a bitstream. The prediction information may include prediction mode information (e.g., skip flag, merge flag or mode index, etc.) and information on motion information as information related to the prediction procedure. The information on the motion information may include candidate selection information (e.g., merge index, mvp flag or mvp index) which is information for deriving a motion vector. In addition, the information on the motion information may include information on the above-described MVD and/or reference picture index information. In addition, the information on the motion information may include information indicating whether to apply L0 prediction, L1 prediction or bi prediction. The residual information is information on the residual samples. The residual information may include information on quantized transform coefficients for the residual samples.

The output bitstream may be stored in a (digital) storage medium and transmitted to the decoding apparatus or may be transmitted to the decoding apparatus via a network.

As described above, the encoding apparatus may generate a reconstructed picture (including reconstructed samples and a reconstructed block) based on the reference samples and the residual samples. This is for the encoding apparatus to derive the same prediction result as that performed by the decoding apparatus, thereby increasing coding efficiency. Accordingly, the encoding apparatus may store the reconstructed picture (or the reconstructed samples and the reconstructed block) in a memory and use the same as a reference picture for inter prediction. As described above, an in-loop filtering procedure is further applicable to the reconstructed picture.

The inter prediction based video/image decoding procedure and the inter prediction unit in the decoding apparatus may schematically include, for example, the following.

The decoding apparatus may perform operation corresponding to operation performed by the encoding apparatus. The decoding apparatus may perform prediction with respect to a current block based on received prediction information and derive prediction samples.

Specifically, the decoding apparatus may determine the prediction mode of the current block based on the received prediction information (S1710). The image decoding apparatus may determine which inter prediction mode applies to the current block based on the prediction mode information in the prediction information.

For example, it may be determined whether the merge mode or the (A)MVP mode applies to the current block based on the merge flag. Alternatively, one of various inter prediction mode candidates may be selected based on the mode index. The inter prediction mode candidates may include a skip mode, a merge mode and/or an (A)MVP mode or may include various inter prediction modes which will be described below.

The decoding apparatus may derive the motion information of the current block based on the determined inter prediction mode (S1720). For example, when the skip mode or the merge mode applies to the current block, the decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. The motion information of the selected merge candidate may be used as the motion information of the current block.

As another example, when the (A)MVP mode applies to the current block, the decoding apparatus may construct an (A)MVP candidate list and use the motion vector of an mvp candidate selected from among mvp candidates included in the (A)MVP candidate list as an mvp of the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

Meanwhile, as described below, the motion information of the current block may be derived without candidate list construction and, in this case, the motion information of the current block may be derived according to the disclosed procedure in the below-described prediction mode. In this case, the above-described candidate list construction may be omitted.

The image decoding apparatus may generate prediction samples of the current block based on motion information of the current block (S1730). In this case, the reference picture may be derived based on the reference picture index of the current block, and the prediction samples of the current block may be derived using the samples of the reference block indicated by the motion vector of the current block on the reference picture. In this case, as described below, some cases, a prediction sample filtering procedure may be further performed with respect to all or some of the prediction samples of the current block.

For example, the inter prediction unit of the decoding apparatus may include a prediction mode determination unit, a motion information derivation unit and a prediction sample derivation unit, and, the prediction mode determination unit may determine the prediction mode of the current block based on the received prediction mode information, the motion information derivation unit may derive the motion information (a motion vector and/or a reference picture index, etc.) of the current block based on the received motion information, and the prediction sample derivation unit may derive the prediction samples of the current block.

The decoding apparatus may generate residual samples of the current block based the received residual information (S1740). The decoding apparatus may generate the reconstructed samples of the current block based on the prediction samples and the residual samples and generate a reconstructed picture based on this (S1750). Thereafter, an in-loop filtering procedure is applicable to the reconstructed picture, as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the encoding apparatus and the decoding apparatus, as described above.

Prediction Sample Generation

Based on motion information derived according to a prediction mode, a predicted block for a current block may be derived. The predicted block may include prediction samples (prediction sample array) of the current block. When a motion vector of the current block specifies a fractional sample unit, an interpolation procedure may be performed, and, through this, based on reference samples of a fractional sample unit within a reference picture, the prediction samples of the current block may be derived. When affine inter prediction applies to the current block, the prediction samples may be generated based on a sample/subblock unit MV. When applying bi-prediction, prediction samples derived through a weighted sum or a weighted average (according to the phase) of the prediction samples derived based on L0 prediction (e.g., prediction using a reference picture and MVL0 in a reference picture list L0) and prediction samples derived based on L1 prediction (e.g., prediction using a reference picture and MVL1 in a reference picture list L1) may be used as the prediction samples of the current block. When applying bi-prediction, if a reference picture used for L0 prediction and a reference picture used for L1 prediction are located in different temporal directions based on a current picture (e.g., in case of bi-prediction and bidirectional prediction), this may be referred to as true bi-prediction.

Reconstructed samples and a reconstructed picture may be generated based on the derived prediction samples and, thereafter, a procedure such as in-loop filtering may be performed as described above.

Weighted Sample Prediction

In inter prediction, weighted sample prediction may be used. Weighted sample prediction may be called weighted prediction. Weighted prediction was designed to compensate for change in illumination in a video sequence. Weighted prediction has been designed in the AVC standard, and this feature is particularly effective in a video encoder and a video splicing application.

For example, weighted prediction may be used as a coding tool for efficiently encoding content to which fading applies. As weighted prediction applies, weighted parameters (e.g., weight and offset) may be signaled for reference pictures belonging to reference picture lists L0 and L1. Accordingly, during a motion compensation process, a weight and an offset for a corresponding reference picture is applicable.

Weighted prediction may apply when a slice type of a current slice located in which a current block (e.g., CU) is located is a P slice or a B slice. For example, weighted prediction may be used not only when applying bi-prediction but also when applying uni-prediction. For example, as described below, weighted prediction may be determined based on weightedPredFlag, and the value of weightedPredFlag may be determined based on a signaled pps_weighted_pred_flag (in case of a P slice) or pps_weighted_bipred_flag (in case of a B slice).

For example, the value of a variable weightedPredFlag may be derived as follows. When a parameter slice_type specifying a current slice type specifies a P slice, the value of weightedPredFlag may be set to the same value as pps_weighted_pred_flag. Otherwise (when the value of slice_type specifies a B slice), the value of weightedPredFlag may be set to the same value as pps_weighted_bipred_flag.

A value of prediction sample(s) which is output of weighted prediction may be referred to as pbSamples. A weighted prediction procedure may be largely divided into a basic weighted (sample) prediction procedure and an explicit weighted (sample) prediction procedure. In some embodiments, the weighted (sample) prediction procedure may mean only an explicit weighted (sample) prediction procedure. For example, when the value of weightedPredFlag is 0, an array pbSamples of prediction samples may be derived according to a basic weighted sample prediction process described below. Otherwise (e.g., when the value of weightedPredFlag is 1), an array pbSamples of prediction sample may be derived according to an explicit weighted sample prediction process. As an embodiment, the explicit weighted sample prediction process will be described below.

Explicit Weighted Sample Prediction Process

For explicit weighted sample prediction processing for generating an array pbSamples having a size of (nCbW)×(nCbH) specifying prediction samples, the following parameters may be used.

variable nCbW specifying the width of a current coding block and variable nCbH specifying the height of the current coding block arrays predSamplesL0 and predSamplesL1 having a size of (nCbW)×(nCbH)

flags predFlagL0 and predFlagL1 specifying utilization of a prediction list reference indices refIdxL0 and refIdxL1 variable cIdx specifying a color component index bitDepth specifying the bit depth of a sample A weighted prediction process may be performed using the above variables as follows. Hereinafter, this will be described with reference to FIG. 18. First, the value of a variable shift1 may be set to a value of Max(2, 14−bitDepth) (S1810). Next, variables log2Wd, o0, o1, w0 and w1 may be derived as follows (S1820). When the value of cIdx is a value (e.g., 0) specifying a luma sample, it may be calculated as shown in the following equation.

log2Wd=luma_log2_weight_denom+shift1 w0=LumaWeightL0[refIdxL0]

w1=LumaWeightL1[refIdxL1]

o0=luma_offset_l0[refIdxL0]<<(BitDepth$_Y$-8)

o2=luma_offset_l1[refIdxL1]<<(BitDepth$_Y$-8)  [Equation 1]

Otherwise (e.g., when the value cIdx is a value (e.g., a non-zero value) specifying a chroma sample value, it may be derived as shown in the following equation.

log2Wd=ChromaLog2WeightDenom+shift1 w0=ChromaWeightL0[refIdxL0][cIdx-1]

w1=ChromaWeightL1[refIdxL1][cIdx-1]

o0=ChromaOffsetL0[refIdxL0][cIdx-1]<<(BitDepth$_C$-8)

o1=ChromaOffsetL1[refIdxL1][cIdx-1]<<(BitDepth$_C$-8)  [Equation 2]

Next, for x=0 . . . nCbW-1 and y=0 . . . nCbH-1, a prediction sample pbSamples[x][y] may be derived as follows (S1830).

When the value of predFlagL0 is 1 and the value of predFlagL1 is 0, the value of the prediction sample may be derived as follows.

if (log2Wd>=1)

pbSamples[x][y]=Clip3(0, (1<<bitDepth)-1, ((predSamplesL0[x][y]*w0+2 log2Wd-1)>>log2Wd)+o0)

else pbSamples[x][y]=Clip3(0, (1<<bitDepth)-1, predSamplesL0[x][y]*w0+o0)  [Equation 3]

Otherwise, when the value of predFlagL0 is 0 and the value of predFlagL1 is 1, the value of the prediction sample may be derived as shown in the following Equation.

if (log2Wd>=1)

pbSamples[x][y]=Clip3(0, (1<<bitDepth)-1, ((predSamplesL1[x][y]*w1+2 log2Wd-1)>>log2Wd)+o1)

else pbSamples[x][y]=Clip3(0,(1<<bitDepth)-1,predSamplesL1[x][y]*w1+o1)  [Equation 4]

Otherwise (when the value of predFlagL0 is 1 and the value of predFlagL1 is 1), the value of the prediction sample may be derived as shown in the following Equation.

pbSamples[x][y]=Clip3(0,(1<<bitDepth)-1,(predSamplesL0[x][y]*w0+predSamplesL1[x][y]*w1+((o0+o1+1)<<log2Wd))>>(log2Wd+1))  [Equation 5]

Prediction Weighted Table

The above-described NAL structure is applicable to a prediction weighted table. In addition, in order to signal the above-described weighted (sample) prediction, a prediction weighted table described below may be used.

The structure of a weighted prediction table for signaling weighted (sample) prediction may be designed similarly to the structure of a weighted prediction table of AVC or HEVC. A weighted prediction process may be initiated by two flags signaled in an SPS.

Figures 18, 19, 20:
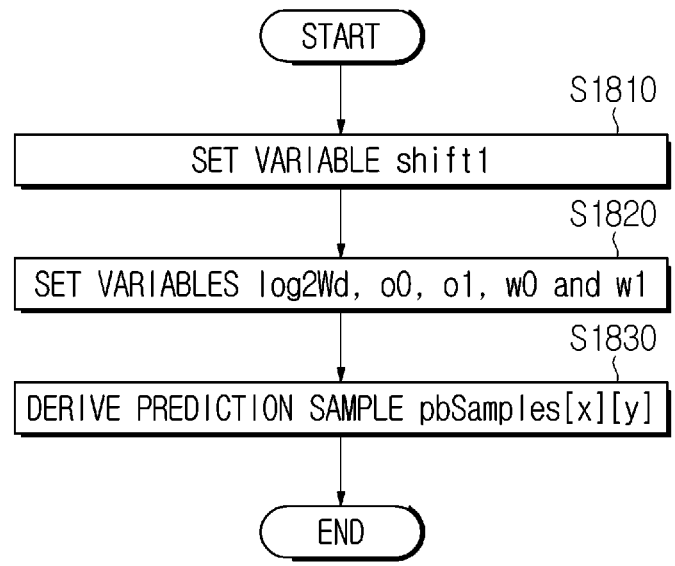
FIG. 18 is a view illustrating a weighted prediction process according to an embodiment.
FIG. 19 is a view illustrating syntax for two syntax elements signaled in an SPS according to an embodiment.
FIG. 20 is a view illustrating a weighted prediction syntax element signaled in a PPS according to an embodiment.

FIG. 19 is a view illustrating syntax for two syntax elements signaled in an SPS. In the syntax shown in FIG. 19, a syntax element sps_weightedpred_flag may specify whether weighted prediction is applicable to a P slice referencing the SPS. For example, a first value (e.g., 0) of sps_weighted_pred_flag may specify that weighted prediction does not apply to the P slice referencing the SPS. A second value (e.g., 1) of sps_weighted_pred_flag may specify that weighted prediction may apply to the P slice referencing the SPS.

A syntax element sps_weighted_bipred_flag may specify whether explicit weighted prediction is applicable to a B slice referencing the SPS. For example, a first value (e.g., 0) of sps_weighted_bipred_flag may specify that explicit weighted prediction does not apply to the B slice referencing the SPS. A second value (e.g., 1) of sps_weighted_bipred_flag may specify that explicit weighted prediction may apply to the B slice referencing the SPS.

The above-described two flags may be signaled through the SPS, and may specify whether weighted prediction is applicable to a P and/or B slice present in a CVS.

FIG. 20 is a view illustrating a weighted prediction syntax element signaled in a PPS. A syntax element pps_weighted_pred_flag may specify whether weighted prediction applies to a P slice referencing the PPS. For example, a first value (e.g., 0) of pps_weighted_pred_flag may specify that weighted prediction does not apply to the P slice referencing the PPS. A second value (e.g., 1) of pps_weighted_pred_flag may specify that weighted prediction applies to the P slice referencing the PPS. Meanwhile, when the value of sps_weighted_pred_flag is a first value (e.g., 0), the value of pps_weighted_pred_flag may be set to the first value (e.g., 0).

A syntax element pps_weighted_bipred_flag may specify whether explicit weighted prediction applies to a B slice referencing the PPS. For example, a first value (e.g., 0) of pps_weighted_bipred_flag may specify that explicit weighted prediction does not apply to the B slice referencing the PPS. A second value (e.g., 1) of pps_weighted_bipred_flag may specify that explicit weighted prediction applies to the B slice referencing the PPS. Meanwhile, when the value of sps_weighted_bipred_flag is a first value (e.g., 0), the value of pps_weighted_bipred_flag may be set to the first value (e.g., 0).

FIG. 21 is a view illustrating a weighted prediction syntax element signaled in a slice header. The slice header may include the following syntax elements. A syntax element slice_pic_parameter_set_id may specify a value of pps_pic_parameter_set_id for a currently used PPS. slice_pic_parameter_set_id may have a value of 0 to 63. Meanwhile, in order to comply with bitstream conformance, a constraint is imposed such that a value of a temporal ID of a current picture is equal to or greater than a temporal ID of a PPS having the same pps_pic_parameter_set_id as slice_pic_parameter_set_id.

A syntax element slice address may specify a slice address of a slice. When the value of slice_address is not provided, the value of slice_address may be derived as 0.

Meanwhile, when the value of rect_slice_flag is a first value (e.g., 0), an ID of a brick may be set as the value of the slice address, slice_address may have a bit length of Ceil(Log 2(NumBricksInPic), and the value of slice_address may have a value of 0 to NumBricksInPic-1. Here, NumBricksInPic may specify the number of bricks with in a picture.

Meanwhile, when the value of rect_slice_flag is a second value (e.g., 1), the following process may be performed. A slice ID of a slice may be set as the value of the slice address. The length of slice_address may be set to a bit length of signalled_slice_id_length_minus1+1.

In addition, when the value of rect_slice_flag is a second value (e.g., 1), if the value of signalled_slice_id_flag is 0, the value of slice_address may have a value of 0 to num_slices_in_pic_minus1. Otherwise (when the value of signalled_slice_id_flag is not 0), the value of slice address may have a value of 0 to $2^{(signalled\_slice\_id\_length\_minus1+1)}-1$.

A syntax element num_ref_idx_active_override_flag may specify whether a syntax num_ref_idx_active_minus1[0] is provided for P and B slices and whether a syntax element num_ref_idx_active_minus1[1] is provided for a B slice. For example, when a first value (e.g., 0) of num_ref_idx_active_override_flag may specify that the syntax elements num_ref_idx_active_minus1[0] and num_ref_idx_active_minus1[1] are not provided. A second value (e.g., 1) of num_ref_idx_active override flag may specify that the syntax element num_ref_idx_active_minus1[0] is provided for the P and B slices and the syntax element num_ref_idx_active_minus1[1] is provided for the B slice.

Meanwhile, when the value of num_ref_idx_active_override_flag is not signaled, the value of num_ref_idx_active_override_flag may be derived as 1.

A syntax element num_ref_idx_active_minus1[i] may be used to derive a variable NumRefIdxActive[i]. The value of num_ref_idx_active_minus1[i] may have a value of 0 to 14.

When the current slice is a B slice, the value of num_ref_idx_active_override_flag is a second value (e.g., 1) and the value of num_ref_idx_active_minus1[i] is not provided, the value of num_ref_idx_active_minus1[i] may be derived as 0 (here, the value of i is 0 or 1).

When the current slice is a P slice, the value of num_ref_idx_active_override_flag is a second value (e.g., 1) and the value of num_ref_idx_active_minus1[0] is not provided, the value of num_ref_idx_active_minus1[0] may be derived as 0.

The value of a variable NumRefIdxActive[i] may be derived as shown in the equation of FIG. 22. Meanwhile, a value of NumRefIdxActive[i]−1 specifying a value of a maximum reference index for a reference picture list i may be used to decode a slice. For example, when the value of NumRefIdxActive[i] is 0, any reference index for the reference picture list i may not be used to decode the slice. Accordingly, when the current slice is a P slice, the value of NumRefIdxActive[0] may be greater than 0. In addition, when the current slice is a B slice, the values of NumRefIdxActive[0] and NumRefIdxActive[1] may be greater than 0.

Meanwhile, like the syntax 2110 of FIG. 21, weighted prediction table syntax pred_weight_table( ) signaling a parameter for weighted prediction may be called according to the values of pps_weighted_pred_flag and pps_weighted_bipred_flag and the value of slice type.

FIG. 23 is a view illustrating weighted prediction table syntax called from a slice header. In the syntax structure of FIG. 23, a syntax element luma_log2_weight_denom may be a syntax element specifying a base 2 logarithm of a denominator for a luma weighting factor. In an embodiment, luma_log2_weight_denom may be a syntax element specifying a logarithm of a denominator for all luma weighting factors. The value of luma_log2_weight_denom may have a value of 0 to 7.

A syntax element delta_chroma_log2_weight_denom may specify a difference of a base 2 logarithm of a denominator for a chroma weighting factor. For example, delta_chroma_log2_weight_denom may specify a difference of a base 2 logarithm of a denominator for all chroma weighting factors. When the value of delta_chroma_log2_weight_denom is not present, the value thereof may be derived as 0.

The value of ChromaLog2WeightDenom may be calculated as luma_log2_weight_denom+delta_chroma_log2_weight_denom. ChromaLog2WeightDenom may have a value of 0 to 7.

A syntax element luma_weight_l0_flag[i] may specify whether weighting factors for a luma component of list 0 prediction using RefPicList[0][i] are present. For example, a first value (e.g., 0) of luma_weight_l0_flag[i] may specify that the weighting factors for the luma component of list 0 prediction using RefPicList[0][i] are not present. A second value (e.g., 1) of luma_weight_l0_flag[i] may specify that the weighting factors for the luma component of list 0 prediction using RefPicList[0][i] are present.

A syntax element chroma_weight_l0_flag[i] may specify presence/absence of weighting factors for a chroma prediction value of list 0 predition using RefPicList[0][i]. For example, a first value (e.g., 0) of chroma_weight_l0_flag[i] may specify that weighting factors for the chroma prediction value of list 0 predition using RefPicList[0][i] are not present. A second value (e.g., 1) of chroma_weight_l0_flag [i] may specify that weighting factors for the chroma prediction value of list 0 predition using RefPicList[0][i] are present. When chroma_weight_l0_flag[i] is not provided, the value thereof may be derived as 0.

A syntax element delta_luma_weight_l0[i] may specify a difference in a weighting factor applying to a luma prediction value for prediction of list 0 using RefPicList[0][i].

A variable LumaWeightL0[i] may be derived as a value of (1<<luma_log2_weight_denom)+delta_luma_weight_l0[i].

When the value of luma_weight_l0 flag[i] is 1, delta_luma_weight_l0[i] may have a value of −128 to 127. When the value of luma_weight_l0_flag[i] is 0, the value of LumaWeightL0[i] may be derived as a value of $2^{luma\_log2\_weight\_denom}$.

A syntax element luma_offset_l0[i] may specify an additive offset applying to a luma prediction value for list 0 prediction using RefPicList[0][i]. luma_offset_l0[i] may have a value of −128 to 127. When the value of luma_weight_l0 flag[i] is 0, the value of luma_offset_l0[i] may be derived as 0.

A syntax element delta_chroma_weight_l0[i][j] may specify a difference in a weighting factor applying to a chroma prediction value for prediction of list 0 using RefPicList[0][i], for Cb when the value of j is 0 and Cr when the value of j is 1.

A variable ChromaWeightL0[i][j] may be derived as a value of (1<<ChromaLog2WeightDenom)+delta_chroma_weight_l0[i][j].

When the value of chroma_weight_l0_flag[i] is 1, delta_chroma_weight_l0[i][j] may have a value of −128 to 127. When the value of chroma_weight_l0_flag[i] is 0, the value of ChromaWeightL0[i][j] may be derived as a value of $2^{ChromaLog2WeightDenom}$.

delta_chroma_offset_l0[i][j] may specify a difference in an additive offset applying to a chroma prediction value for prediction of list 0 using RefPicList[0][i], for Cb when the value of j is 0 and Cr when the value of j is 1.

A variable ChromaOffsetL0[i][j] may be derived as shown in the following equation.

$$\text{ChromaOffset}L0[i][j]=\text{Clip3}(-128,127,(128+\text{delta\_chroma\_offset\_l0}[i][j]-((128*\text{ChromaWeight}L0[i][j])>>\text{ChromaLog2WeightDenom}))) \quad \text{[Equation 6]}$$

delta_chroma_offset_l0[i][j] may have a value of −4*128 to 4*127.

Meanwhile, when the value of chroma_weight_l0_flag[i] is 0, the value of ChromaOffsetL0[i][j] may be derived as 0.

Redesign of Pred Weight Table Syntax

The above-described prediction weighted table may be parsed in a slice header. Hereinafter, an embodiment in which the prediction weighted table is parsed in an APS will be described as an alternative embodiment.

FIG. 24 is a view illustrating syntax in which a prediction weighted table is signaled in an APS RBSP. As shown in FIG. 24, a prediction weighted table may be included in the APS RBSP. For this, each APS RB SP may be used in a decoding process before it is referenced. For example, each APS RBSP may be included in at least one access unit having a temporal ID TemporalId equal to or less than the temporal ID TemporalId of an encoded slice NAL unit or may be provided from the outside.

For this, in an embodiment, when aspLayerId may be used as nuh_layer_id of the APS NAL unit. For example, when a layer having the same value as aspLayerId is an independent layer (e.g., when the value of vps_independent_layer_flag[GeneralLayerIdx[aspLayerId]] is 1), the APS NAL unit including the APS RBSP shall have nuh_layer_id having the same value as nuh_layer_id of an encoded slice NAL unit referencing this. Otherwise, the APS NAL unit including the APS RBSP shall have nuh_layer_id having the same value as nuh_layer_id of an encoded slice NAL unit referencing this or nuh_layer_id having the same value as nuh_layer_id of a direct dependent layer of a layer including an encoded slice NAL unit referencing this.

In addition, in an access unit, all APS NAL units having adaptation_parameter_set_id of a specific value and aps_params_type of a specific value shall have the same content.

Hereinafter, the syntax elements shown in FIG. 24 will be described. A syntax element adaptation_parameter_set_id may specify an identifier for an APS. adaptation_parameter_set_id may be used as the identifier for the APS such that another syntax element references the APS. When the value of aps_params_type described below is equal to LMCS_APS, adaptation_parameter_set_id may have a value of 0 to 3.

A syntax element aps_params_type may specify a type of an APS parameter transmitted using an APS as shown in the following table. For example, when the value of aps_params_type is a first value (e.g., 1), the type of the APS may be determined to be an LMCS_APS type transmitting an LMCS parameter, and adaptation_parameter_set_id may have a value of 0 to 3.

In the same way, when the value of aps_params_type is a third value (e.g., 3), the type of the APS may be determined to be a PRED_WEIGHT_APS type transmitting prediction weighted parameters.

TABLE 2

| aps_params_type | Name of aps_params_type | Type of APS parameters |
| --- | --- | --- |
| 0 | ALF_APS | ALF parameters |
| 1 | LMCS_APS | LMCS parameters |
| 2 | SCALING_APS | Scaling list parameters |
| 3 | PRED_WEIGHT_APS | Prediction weighted parameters |
| 4 . . . 7 | Reserved | Reserved |

In this case, each individual type of the APS may have an individual data space for adaptation_parameter_set_id. In addition, an APS NAL unit (having adaptation_parameter_set_id of a specific value and aps_params_type of a specific value) may be shared between pictures. In addition, different slices in one picture may reference different ALF APSs.

A syntax element aps_extension_flag may specify whether aps_extension_data_flag syntax elements are provided in the APS RBSP syntax structure. For example, a first value (e.g., 0) of aps_extension_flag may specify that the aps_extension_data_flag syntax elements are not provided in the APS RBSP syntax structure. A second value (e.g., 1) of aps_extension_flag may specify that the aps_extension_data_flag syntax elements are provided in the APS RBSP syntax structure.

aps_extension_data_flag may have any value. Presence/absence of aps_extension_data_flag and the value of aps_extension_data_flag have no effect on decoder conformance. For example, the decoder may ignore all aps_extension_data_flag syntax elements.

As described above, a new aps_params_type may be added to an existing type. In addition, instead of content of pred_weight_table( ) the slice header may be modified as shown in FIG. 25 in order to signal an APS ID. FIG. 25 is a view illustrating syntax of a modified slice header. In the syntax of FIG. 25, a syntax element slice_pred_weight_aps_id may specify adaptation_parameter_set_id of a prediction weighted table APS. A temporal ID TemporalId of an APS NAL unit having aps_params_type having the same value as PRED_WEIGHT_APS and adaptation_parameter_set_id having the same value as slice_pred_weight_aps_id may be less than or equal to the temporal ID of an encoded slice NAL unit. When slice_pred_weight_aps_id is provided, the value of slice_pred_weight_aps_id may have the same value for all slices of one picture.

FIG. 26 is a view illustrating an example of a prediction weighted table (e.g., pred_weight_table( )) syntax. The syntax of FIG. 26 may be a syntax structure called by pred_weight_data( ) of FIG. 24. For example, the syntax name of FIG. 26 may be modified to pred_weight_data( ) and used.

In the syntax of FIG. 26, a syntax element num_lists_active_flag may specify whether prediction weighted table information is signaled with respect to reference lists. For example, a first value (e.g., 0) of num_lists_active_flag may specify that prediction weighted table information is not signaled with respect to all reference lists. For example, a first value (e.g., 0) of num_lists_active_flag may specify that prediction weighted table information may be signaled only with respect to reference list L0. Accordingly, only NumRefIdxActive[0] syntax element for reference list L0 may be obtained from a bitstream according to the syntax structure of FIG. 26 (2610), and weight information of reference list L0 may be obtained from the bitstream according to the value of NumRefIdxActive[0] (S2620).

Meanwhile, a second value (e.g., 2) of num_lists_active_flag may specify that prediction weighted table information is signaled even with respect to reference list 1. For example, a second value (e.g., 1) of num_lists_active_flag may specify that prediction weighted table information may be signaled with respect to both reference lists L0 and L1. Accordingly, the values of NumRefIdxActive[0] and NumRefIdxActive[1] syntax elements may be obtained from the bitstream with respect to reference lists L0 and L1 according to the syntax structure of FIG. 26 (2610). In addition, when the value of num_lists_active_flag is a second value (e.g., 1) (2630), weight information may be obtained from a bitstream with respect to reference list L1 according to the value of NumRefIdxActive[1] (2640).

A syntax element numRefIdxActive[i] may be used to specify the number of utilized reference indices. numRefIdxActive[i] may have a value of 0 to 14.

Syntax and semantics in FIG. 26 and the description thereof may specify whether information on at least one list is parsed in an APS when a flag num_lists_active_flag is parsed.

Meanwhile, descriptors described in the syntax in the above description may be interpreted as having the following meaning.
- ae(v): context adaptive arithmetic entropy encoding syntax element
- b(8): byte unit syntax element having a bit string pattern. A syntax element according to this may be parsed as an 8-bit value.
- f(n): syntax element described as an n-bit fixed pattern bit string in which a left bit has priority.
- i(n): integer syntax element with a sign using n bits. In the syntax table, when n is denoted by v, the number of bits constructing the corresponding syntax element may be determined based on a value of another syntax element.
- se(v): integer 0-th order Exp-Golomb-coded syntax element with a sign in which a left bit has priority. A parsing process for this descriptor may be specified by a k value set to 0.
- st(v): syntax element described as a bitstring terminated with a null value, like UTF-8(UCS (universal coded character set) transmission format-8).
- tu(v): truncated unary syntax element
- u(n): integer syntax element without a sign, which may be expressed by n bits. In the syntax table, when n is denoted by v, the value of a bit expressing the corresponding syntax element may be determined according to a value of another syntax element.
- ue(v): 0-th order Exp-Golomb-coded syntax element having an integer value without a sign in which a left bit has priority. A parsing process for this descriptor may be specified by a k value set to 0.

Encoding and Decoding Method

Figure 27:
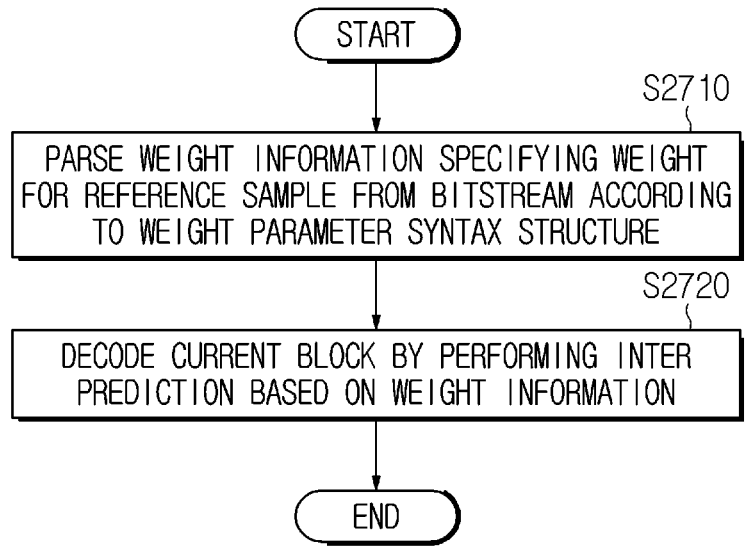
FIGS. 27 to 28 are views illustrating operation of a decoding apparatus and an encoding apparatus according to an embodiment.

Hereinafter, an image decoding method performed by an image decoding apparatus will be described with reference to FIG. 27. The image decoding apparatus according to an embodiment may include a memory and a processor, and the processor may perform the following operation.

First, the decoding apparatus may parse weight information specifying a weight for a reference sample from a bitstream according to a weight parameter syntax structure (S2710). For example, the decoding apparatus may obtain syntax elements such as luma_log2_weight_denom, delta_chroma_log2 weight_denom, num_lists_active_flag, NumRefIdxActive[i], luma_weight_l0_flag[i], chroma_weight_l0_flag[i], delta_luma_weight_l0[i], luma_offset_l0[i], delta_chroma_weight_l0[i][j] and delta_chroma_offset_l0[i][j] for the weight based on pred_weight_table( ) syntax which is a weight parameter syntax element, as described with reference to FIG. 26. As described above, the pred_weight_table( ) syntax may be called from a slice header or APS RBSP, as described above.

Next, the decoding apparatus may decode a current block by performing inter prediction based on weight information as described above (S2720). For example, the decoding apparatus may derive a prediction sample array pbSamples, to which weighted prediction applies, as the above-described explicit weighted sample prediction process is performed based on the syntax element obtained from the bitstream.

Meanwhile, in order to perform step S2710 of parsing the weight information according to the weight parameter syntax structure, the decoding apparatus may obtain weight number information (e.g., NumRefIdxActive[i]) specifying the number of weight information obtained from the bitstream according to the weight parameter syntax structure. In addition, the decoding apparatus may obtain weight information (e.g., luma_weight_l0_flag[i], chroma_weight_l0_flag[i], delta_luma_weight_l0[i], luma_offset_l0[i], delta_chroma_weight_l0[i][j], delta_chroma_offset_l0[i][j]) from the weight parameter syntax structure based on the weight number information.

Here, the weight number information may be obtained from the bitstream according to the weight parameter syntax structure based on flag information (e.g., num_lists_active_flag) obtained from the bitstream. In addition, the flag information may specify whether the weight number information is obtained from the bitstream by the weight parameter syntax structure. In addition, the weight number information may be individually obtained for each reference picture list which may be used to decode the current block. In addition, weight number information of a reference picture list used when bidirectional reference is used to decode the current block may be determined based on a value of the flag information.

Meanwhile, the weight parameter syntax structure may be signaled by a network abstraction layer (NAL) unit signaling a parameter set. For example, as described above, the weight parameter syntax structure may be signaled using an ASP NAL unit. In this case, weight information of the current block may be identified based on a parameter set identifier obtained from header information of a slice including the current block. Furthermore, all slices belonging to one picture may be limited to use weight information by using a parameter set identified by the same identifier.

Figure 28:
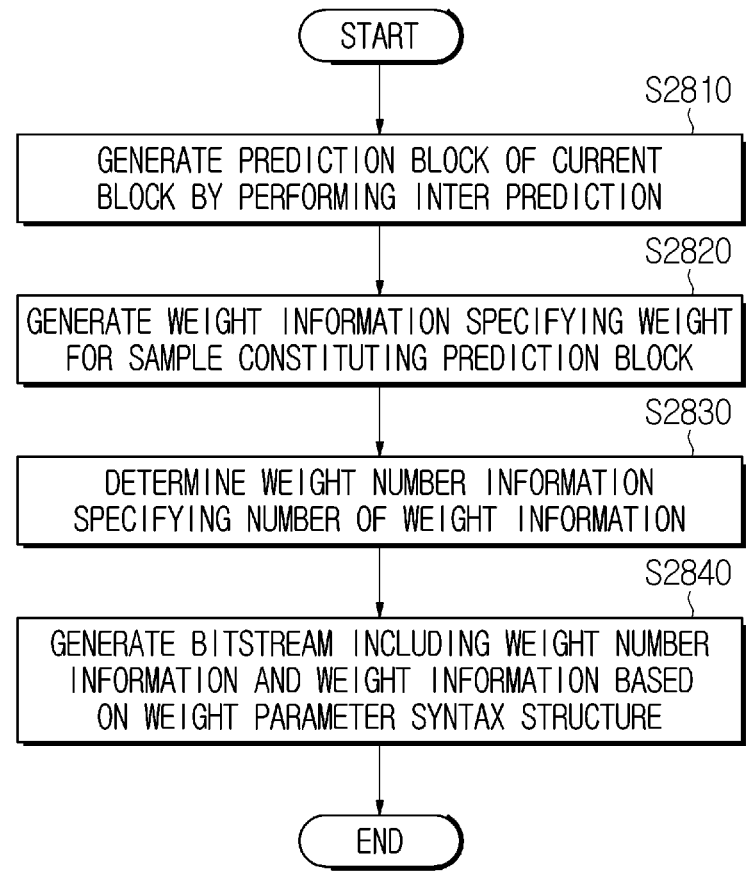

Hereinafter, an image encoding method performed by an image encoding apparatus will be described with reference to FIG. 28. The image encoding apparatus according to an embodiment may include a memory and a processor, and the processor may perform operation corresponding to operation of the decoding apparatus.

For example, the encoding apparatus may generate a prediction block of a current block by performing inter prediction (S2810). Next, the encoding apparatus may generate weight information specifying a weight for a sample constructing the prediction block (S2820). Next, the encoding apparatus may determine weight number information specifying the number of weight information (S2830). Next, the encoding apparatus may generate a bitstream including the weight number information and the weight information based on a weight parameter syntax structure (S2840).

In addition, flag information specifying whether the weight number information is included in the bitstream may be further included in the bitstream. The flag information may specify whether the weight number information is obtained from the bitstream by the weight parameter syntax structure.

Furthermore, the weight number information may be individually obtained for each reference picture list which may be used to decode a current block. The flag information may be used to determine whether the weight number information of a reference picture list used when bidirectional reference is used to decode the current block is obtained.

APPLICATION EMBODIMENT

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 29:
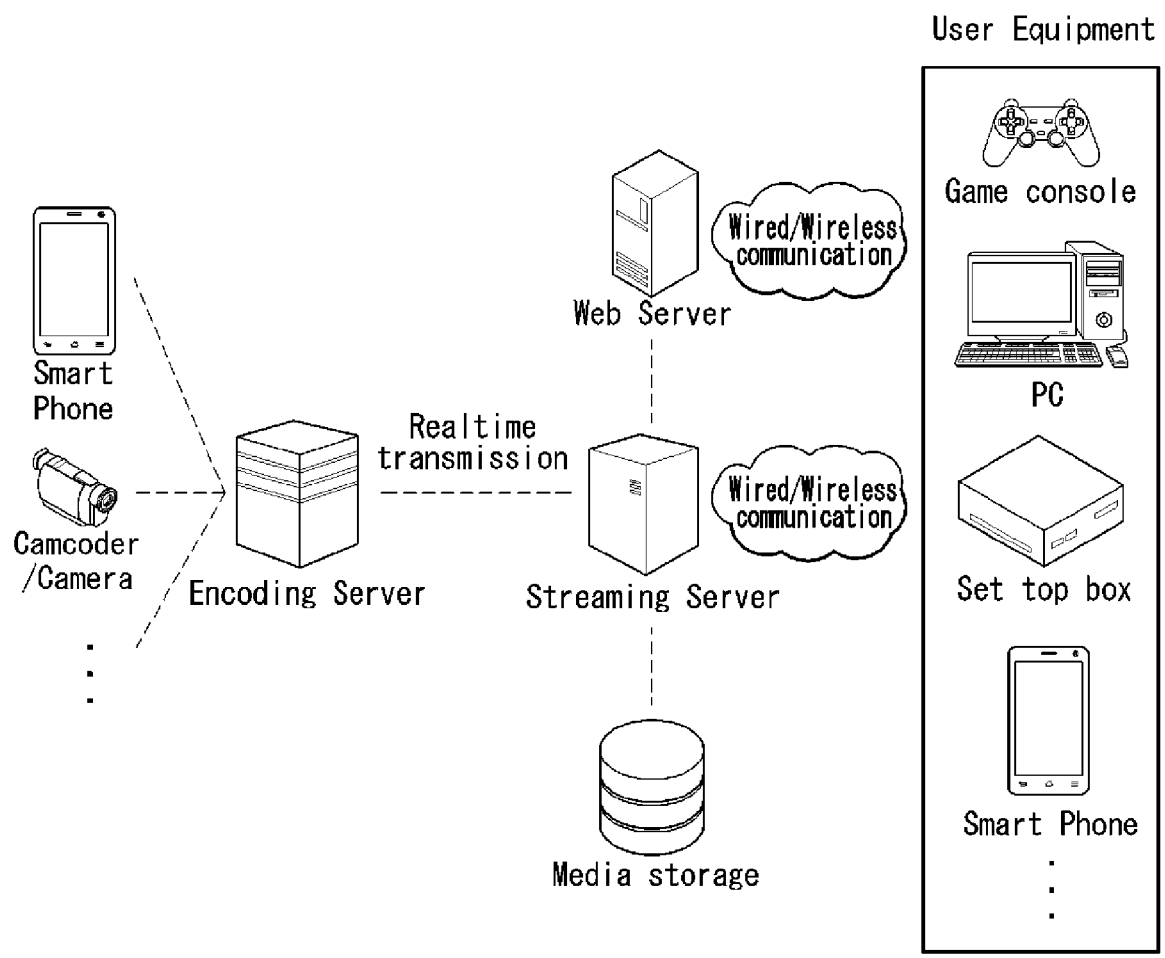
FIG. 29 is a view showing a content streaming system, to which an embodiment of the present disclosure is applicable.

FIG. 29 is a view showing a contents streaming system, to which an embodiment of the present disclosure is applicable.

As shown in FIG. 29, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
   obtaining weight information related to a weight from a bitstream according to a weight parameter syntax structure, wherein the weight information includes first syntax elements; and
   decoding a current block by performing inter prediction based on the weight information,
   wherein the decoding the current block comprises:
   deriving prediction samples of the current block based on the weight information; and
   decoding the current block based on residual samples of the current block and the prediction samples,
   wherein the obtaining the weight information according to the weight parameter syntax structure comprises:
   obtaining weight number information related to a number of the first syntax elements obtained from the bitstream according to the weight parameter syntax structure; and obtaining the first syntax elements from the weight parameter syntax structure based on the weight number information, wherein the first syntax elements specifies a difference of a weighting factor, wherein the weight number information is obtained from the bitstream according to the weight parameter syntax structure based on flag information obtained from the bitstream, wherein the flag information specifies whether the weight number information is obtained from the bitstream by the weight parameter syntax structure.

2. The image decoding method of claim 1, wherein the weight number information is individually obtained for a reference picture list usable to decode the current block.

3. The image decoding method of claim 2, wherein weight number information of a reference picture list used when bidirectional reference is used to decode the current block is determined based on a value of the flag information.

4. The image decoding method of claim 1, wherein the weight parameter syntax structure is signaled by a network abstraction layer (NAL) unit signaling a parameter set.

5. The image decoding method of claim 4, wherein the weight information of the current block is identified based on a parameter set identifier obtained from header information of a slice including the current block.

6. The image decoding method of claim 5, wherein all slices belonging to one picture uses the weight information by using a parameter set identified by the same identifier.

7. An image encoding method performed by an image encoding apparatus, the image encoding method comprising:

generating prediction samples of a current block by performing inter prediction; and generating residual samples of the current block based on the prediction block, wherein weight information related to a weight is generated, wherein the weight information includes first syntax elements, wherein weight number information related to a number of the first syntax elements is determined, wherein a bitstream including the weight number information and the weight information based on a weight parameter syntax structure is generated, wherein the first syntax elements specifies a difference of a weighting factor, wherein the weight number information is included in the bitstream based on flag information included in the bitstream, and wherein the flag information specifies whether the weight number information is obtained from the bitstream by the weight parameter syntax structure.

8. The image encoding method of claim 7, wherein the weight number information is individually obtained for a reference picture list usable to decode the current block.

9. The image encoding method of claim 8, wherein the flag information is used to determine whether weight number information of a reference picture list used when bidirectional reference is used to decode the current block is obtained.

10. A method of transmitting a bitstream generated by an image encoding method, the image encoding method comprising:

generating prediction samples of a current block by performing inter prediction; and generating residual samples of the current block based on the prediction block, wherein weight information related to a weight is generated, wherein the weight information includes first syntax elements, wherein weight number information related to a number of the first syntax elements is determined, wherein a bitstream including the weight number information and the weight information based on a weight parameter syntax structure is generated, wherein the first syntax elements specifies a difference of a weighting factor, wherein the weight number information is included in the bitstream based on flag information included in the bitstream, and wherein the flag information specifies whether the weight number information is obtained from the bitstream by the weight parameter syntax structure.

11. A non-transitory computer-readable recording medium storing a bitstream generated by the image encoding method of claim 7.

* * * * *